US011861309B2

(12) United States Patent
Wiranata et al.

(10) Patent No.: US 11,861,309 B2
(45) Date of Patent: Jan. 2, 2024

(54) PROCESSING SERVICE NOTES

(71) Applicant: Hewlett-Packard Development Company, L.P., Spring, TX (US)

(72) Inventors: Anton Wiranata, Boise, ID (US); Niranjan Damera Venkata, Chennai (IN); Prasad Hegde, Bangalore (IN); Aravindakshan B, Chennai (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 280 days.

(21) Appl. No.: 17/298,592

(22) PCT Filed: Nov. 25, 2019

(86) PCT No.: PCT/US2019/062908
§ 371 (c)(1),
(2) Date: May 30, 2021

(87) PCT Pub. No.: WO2020/159606
PCT Pub. Date: Aug. 6, 2020

(65) Prior Publication Data
US 2022/0147711 A1   May 12, 2022

(30) Foreign Application Priority Data

Jan. 30, 2019 (IN) ............................ 201941003799

(51) Int. Cl.
| | | |
|---|---|---|
| *G06F 11/00* | (2006.01) | |
| *G06F 40/279* | (2020.01) | |
| *G06N 20/00* | (2019.01) | |
| *G06F 40/58* | (2020.01) | |

(52) U.S. Cl.
CPC ............ *G06F 40/279* (2020.01); *G06F 40/58* (2020.01); *G06N 20/00* (2019.01)

(58) Field of Classification Search
CPC .................................. G06F 11/00; G06F 40/58
See application file for complete search history.

(56) References Cited

U.S. PATENT DOCUMENTS

| | | |
|---|---|---|
| 6,970,804 B2 | 11/2005 | Siegel et al. |
| 7,243,270 B2 | 7/2007 | Taniguchi et al. |
| 8,145,073 B2 | 3/2012 | Bouchard et al. |
| 8,935,153 B2 | 1/2015 | McKeeman et al. |
| (Continued) | | |

FOREIGN PATENT DOCUMENTS

| | | | |
|---|---|---|---|
| CN | 109902731 B | * | 12/2020 |
| JP | 2017174151 A | | 9/2017 |
| (Continued) | | | |

*Primary Examiner* — Shreyans A Patel
(74) *Attorney, Agent, or Firm* — Michael Dryja (57) ABSTRACT

Example techniques for processing service notes are described. In an example, labeled service notes, associated with fuser units of a plurality of image rendering devices, are processed to generate a vector corresponding to each of the labeled service notes, a labeled service note comprising natural language text describing an error event and a corresponding service activity associated with a fuser unit, wherein the labeled service note is assigned a label based on a category of failure of the fuser unit. Based on the processing, a relationship between vectors and labels corresponding to the labeled service notes is generated.

15 Claims, 6 Drawing Sheets

(56) References Cited

U.S. PATENT DOCUMENTS

| | | | |
|---|---|---|---|
| 9,235,819 | B2 | 1/2016 | Torii et al. |
| 9,696,947 | B1 | 7/2017 | Gil |
| 10,884,842 | B1 * | 1/2021 | Ramachandran Vijayalekshmi .... G06F 18/214 |
| 2006/0056872 | A1 * | 3/2006 | Hosoi ................. G03G 15/5016 399/81 |
| 2006/0224254 | A1 | 10/2006 | Rumi et al. |
| 2012/0232905 | A1 | 9/2012 | Rajpathak et al. |
| 2017/0046625 | A1 | 2/2017 | Takaai |
| 2017/0255610 | A1 | 9/2017 | Tajika et al. |
| 2018/0005461 | A1 | 1/2018 | Steketee et al. |
| 2019/0347188 | A1 * | 11/2019 | Sobran ................... G06N 20/00 |
| 2022/0147711 | A1 * | 5/2022 | Wiranata ............... G06F 40/279 |

FOREIGN PATENT DOCUMENTS

| | | | | |
|---|---|---|---|---|
| WO | WO-2017117348 A1 | | 7/2017 | |
| WO | WO-2020091778 A1 | * | 5/2020 | .......... G06F 11/0733 |
| WO | WO-2020159606 A1 | * | 8/2020 | ........... G06F 40/279 |

* cited by examiner

PROCESSING SERVICE NOTES

BACKGROUND

Image rendering devices, such as printers and photocopiers print content on media. Printing involves deposition of print material on a medium to form markings on a medium.

An image rendering device operating based on laser printing technology may incorporate a fuser unit to enable the printing. The fuser unit has two rollers through which the medium passes during printing. The rollers of the fuser unit are heated to melt the print material and when the medium passes through the heated rollers, the melted print material is deposited on the medium and the medium is pressed by the rollers such that the melted print material bonds with the medium to form markings on the medium.

BRIEF DESCRIPTION OF FIGURES

The following detailed description references the drawings, wherein.

DETAILED DESCRIPTION

An image rendering device, such as a printer, plotter, photocopier or fax machine may comprise a fuser unit to form impressions on a medium. The fuser unit comprises a pair of rollers which are heated to melt a printing material, such as toner. The melted printing material is then deposited on the medium, as the medium is passed through the rollers, to form the impressions on the medium. Apart from melting the printing material, the rollers also apply pressure on the medium so that the melted printed material adhere to the medium.

Since fuser units experience heat and pressure during their working, the fuser units are prone to malfunction and failure. Thus, the fuser units may undergo periodic maintenance and sometimes be replaced. There may be a plurality of error events which may lead to servicing or replacement of a fuser unit. For example, a fuser unit may undergo servicing after the fuser unit has printed 20,000 pages. In another example, the fuser unit may need replacement after three consecutive overheating events.

Analysis of such plurality of error events and their corresponding service activities, for instance, for patterns of events that lead to failure of the fuser units, may enable a prediction of failure of a given fuser unit to be made. Accordingly, fuser event prediction engines may be implemented to predict failure of the fuser units. The fuser event prediction engines may be trained to predict malfunction of the fuser units based on the error events and corresponding service activities recorded for a plurality of image rendering devices in the past.

Thus, service notes describing error events and corresponding service activities relating to the fuser units may serve as training data for the fuser event prediction engines. Generation of the training data from the service notes, involves manual processing of the service notes by experts to categorize the service notes into various categories of failures of fuser units. Thus, each of the service notes is analyzed manually and is tagged with a label corresponding to a category of failure. Given that the volume of the service notes is large, manual labeling of the service notes is very time consuming.

According to various aspects of the present subject matter, methods and systems for automated processing of service notes are described. In an example, the methods and systems for processing of service notes enable labeling of the service notes, thereby eliminating manual labeling of the service notes.

According to example implementations of the present subject matter, service notes comprising natural language text describing error event and corresponding service activities, associated with fuser units of a plurality of image rendering devices, are obtained. The service notes are assigned a label based on a category of failure of the fuser units to obtain labeled service notes. In an example, the labeling of the service notes may be based on user inputs. The labeled service notes are processed, for example, by a natural language processing engine to generate a vector corresponding to each of the labeled service notes. A vector corresponding to a labeled service note may be understood as a numerical representation of the service note generated based on natural language processing of the service note.

A relationship between vectors and labels corresponding to the labeled service notes may be determined. For example, a learning engine may generate a function, mapping the relationship between the vectors and the labels. Based on the determined relationship, a label for an unlabeled service note may be determined. Thus, based on a set of service notes that is labeled by users, automatic labeling of further service notes may be performed without user intervention. As will be apparent, the set of service notes used by the learning engine to learn the relationship between vectors and labels, may be small in volume initially and may increase in volume as the further service notes are labeled.

In an example, the service notes, labeled based on the above described techniques, may be used to train fuser event prediction engines to predict malfunction of the fuser units. Thus, the techniques to label service notes described herein provide for large volumes of training data to be generated for efficient training of fuser event prediction engines in a time-efficient manner.

The above described methods and systems for processing of service notes are further described with reference to FIGS. 1 to 6. It should be noted that the description and figures merely illustrate the principles of the present subject matter along with examples described herein and, should not be construed as a limitation to the present subject matter. It is thus noted that various arrangements may be devised that, although not explicitly described or shown herein, describe the principles of the present subject matter. Moreover, all statements herein reciting principles, aspects, and examples of the present subject matter, as well as specific examples thereof, are intended to encompass equivalents thereof.

Figure 1:
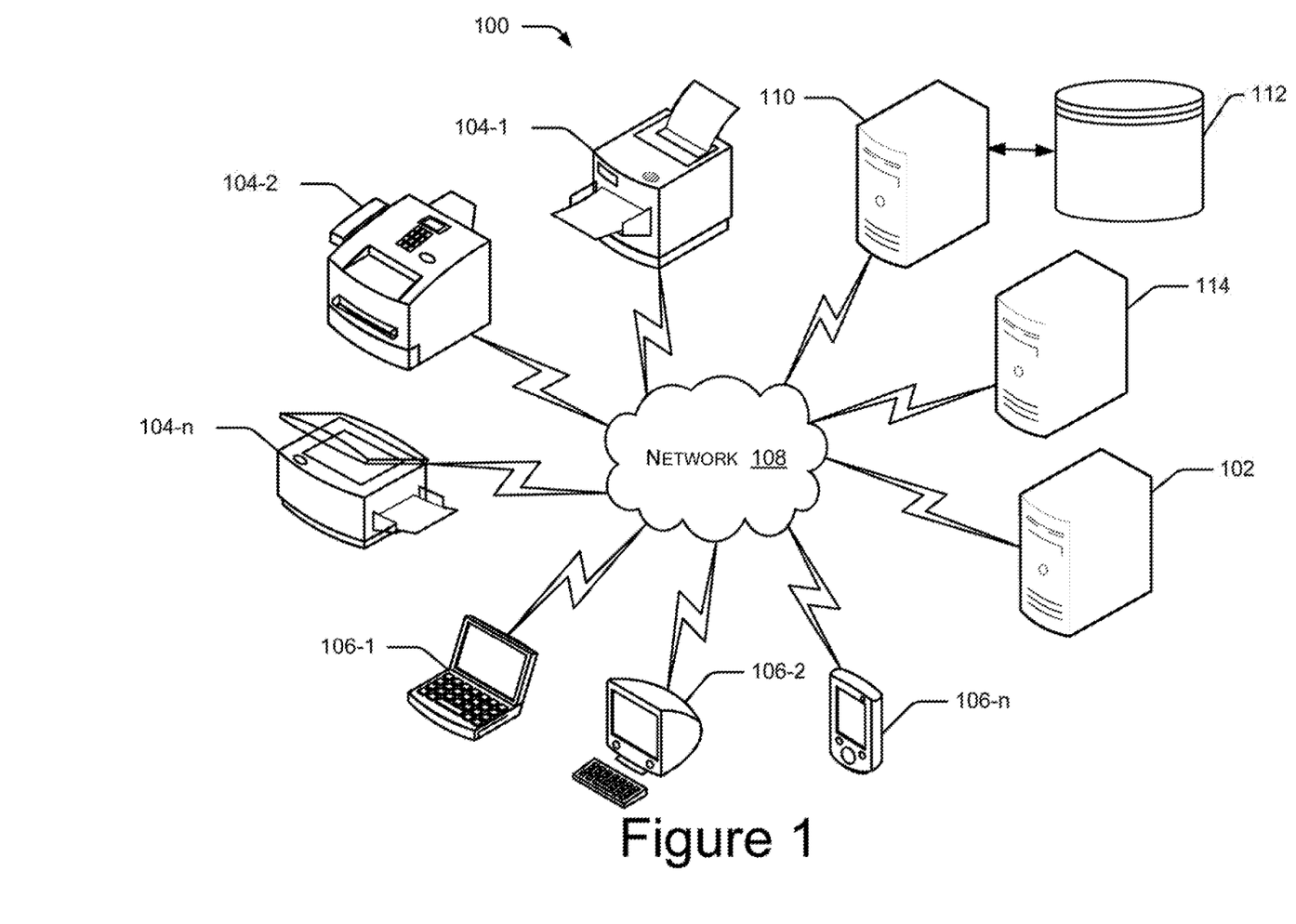
FIG. 1 illustrates a print environment implementing a machine learning system for processing service notes associated with image rendering devices, in accordance with an example of the present subject matter.

FIG. 1 illustrates a print environment 100 incorporating a machine learning device 102, in accordance with an example of the present subject matter.

In an example, the print environment 100 comprises a plurality of image rendering devices 104-1, 104-2, . . . , 104-n. Examples of the image rendering device 104-1, 104-2, . . . , 104-n include printers, plotter, scanners, photocopier and any other electronic devices that incorporate a fuser unit to fuse a print material for deposition on a medium. Further, examples of the image rendering device 104-1, 104-2, . . . , 104-n also include 3D printers that may print three dimensional objects based on an additive manufacturing process. In case of the 3D printers, the fuser unit may be employed to fuse materials used in the additive manufacturing process.

In the print environment 100, each of the image rendering devices 104-1, 104-2, . . . , 104-n may be accessed by multiple users through their respective user devices 106-1, 106-2, . . . , 106-n. Examples of the user devices 106-1, 106-2, . . . , 106-n include, but are not limited to, electronic device, such as a desktop computer, a laptop, a smartphone, a personal digital assistant (PDAs), and a tablet that may allow a user to communicate with the image rendering devices 106-1, 106-2, . . . , 106-n. In an example, the user devices 106-1, 106-2, . . . , 106-n may communicate with the image rendering devices 104-1, 104-2, . . . , 104-n over a network 108.

The network 108 may be a single network or a combination of multiple networks and may use a variety of different communication protocols. The network 108 may be a wireless or a wired network, or a combination thereof. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NON), Public Switched Telephone Network (PSTN). Depending on the technology, the communication network 108 includes various network entities, such as gateways, routers; however, such details have been omitted for the sake of brevity of the present description.

In the print environment 100, the image rendering devices 104-1, 104-2, . . . , 104-n and the user devices 106-1, 106-2, . . . , 106-n may also communicate with a server 110. The server 110 may be implemented as any of a variety of conventional computing devices, including, a desktop, a personal computer, a notebook or portable computer, a workstation, a mainframe computer, and a laptop. Further, in one example, the server 110 may be a distributed or centralized network system in which different computing devices may host one or more of the hardware or software components of the server 110.

The server 110, for example, may be implemented by a service provider or administrator associated with the image rendering devices 104-1, 104-2, . . . , 104-n to perform a variety of functions relating to the image rendering devices 104-1, 104-2, . . . , 104-n. For example, the server 110 may manage subscription plans and maintain subscriber details relating to the users and their respective user devices 106-1, 106-2, . . . , 106-n. In an example, the server 110 may also define rights for the users, such that each user may use the image rendering devices 104-1, 104-2, . . . , 104-n in accordance with their respective rights. In another example, the server 110 may track scheduled maintenance activities for the image rendering devices 104-1, 104-2, . . . , 104-n in the print environment 100. Similarly, in an example implementation, the server 110 may receive and store user inputs relating to working of the image rendering devices 104-1, 104-2, . . . , 104-n.

In an example, in case a user faces an issue, such as occurrence of error events in any of the image rendering devices 104-1, 104-2, . . . , 104-n, such as the image rendering device 106-1, the user may provide the user inputs relating to the issue to the server 110. For the purpose, the user may communicate with the server 110 via the user device 106-1. Various techniques may be used by the users to provide the inputs to the server 110. In an example, a web-based interface of the server 110 may be used. In another example, an electronic mail or message may be sent to the server 110. Further, indirect modes of communication, such as a mode where a user may telephonically provide the information to another user, such as a helpdesk representative of the service provide who in turn enters the inputs in the server 110, are also possible. The user inputs may be in natural language.

In an example implementation, when an error event relating to any of the image rendering devices 104-1, 104-2, . . . , 104-n is reported by a user or detected by the server 110 even otherwise, for example, based on an error message generated by any of the image rendering devices 104-1, 104-2, . . . , 104-n, a service activity corresponding to the error event may be performed. For instance, based on the user inputs relating to the error event pertaining to the image rendering device 106-1, a technician may service the image rendering device 106-1 to address the error event. The technician's remark regarding the service activity may also be recorded. The technician's remark, alike the user inputs, may also be in natural language.

The user input pertaining to an error event and the remarks of a technician in relation to the service activity corresponding to the error event comprises a service note associated with the image rendering device 106-1. Accordingly, as will be apparent a service note comprises natural language text describing an error event and a corresponding service activity associated with a fuser unit of the image rendering device 106-1.

In an example implementation, a database 112 is coupled to the server 110 to store service notes associated with the plurality of image rendering devices 104-1, 104-2, . . . , 104-n. In an implementation, the database 112 may be implemented as a hierarchical database, a network database, an object-oriented database, or a relational database.

In accordance with an example of the present subject matter, the machine learning device 102, may be coupled to the database 112 and/or the server 110 to obtain and process the service notes, for instance, to enable prediction of an error event associated with the image rendering devices 104-1, 104-2, . . . , 104-n. In an implementation, the machine learning device 102 may be implemented as any of a variety of computing devices, including, a server, a mainframe computer, a workstation, a desktop, a personal computer, a notebook or portable computer, or a laptop.

In accordance with an example of the present subject matter, the machine learning device 102 processes the service notes associated with fuser units of the plurality of image rendering devices 104-1, 104-2, . . . , 104-n. For the purpose, the machine learning device 102 may retrieve service notes from the database 112. While the database 112 may include service notes associated with various parts of the image rendering devices 104-1, 104-2, . . . , 104-n, the machine learning device 102 may filter the service notes associated with fuser units of the image rendering devices 104-1, 104-2, . . . , 104-n. Also, service notes comprising error event, such as failure and malfunctioning of the fusers that lead to replacement to the fuser may be filtered.

In an example, the filtered service notes associated with fuser units of the image rendering devices 104-1, 104-2, . . . , 104-n are labeled. In the present context, labeling of a service note may be understood as assigning a label to the service note based on a category of failure of the fuser unit. To elaborate labeling of a service note, consider that the service note describes, for instance, an error event, such as print quality related issue, a paper jam issue, or a noise related issue. Given that the error event has resulted in replacement to the associated fuser, the cause of failure of the fuser is the print quality related issue, paper jam issue, or noise related issue, as the case may be. The service note may accordingly be labeled as 'print quality related issue', 'paper jam issue', or 'noise related issue'. Thus, a tag indicative of the category of failure of the fuser unit is associated with each of the service notes, thereby generating labeled service notes.

The labeling of the service notes may be performed by users, for example, experts who may determine a cause of failure of the fuser unit based on the natural text description included in the service notes. In some example implementations, the labeling of the service notes may be performed by the machine learning device 102 based on predefined rules defined by users.

The machine learning device 102 thereafter processes the labeled service notes to generate a vector corresponding to each of the labeled service notes. As explained previously, a service note comprises description of an error event and a service activity associated with a fuser unit in a natural language. The machine learning device 102 performs natural language processing of the service note to obtain a numerical representation of the corresponding natural language description so as to render the natural language description comprehendible by the machine learning device 102. As explained previously, each of the vectors is tagged with a corresponding label.

The vectors and labels corresponding to the labeled service notes may be used to determine a label for an unlabeled service note. To determine the label, the unlabeled service note may be converted into its corresponding vector. In an example, the vector of the unlabeled service note may be similar to a vector of a labeled service note if the labeled service note includes a natural language description that is similar to the description in the unlabeled service note. In an example, the similarity in the two descriptions and in turn the similarity in the two vectors, may enable the machine learning device 102 to determine the label associated with the labeled service note to be the label for the unlabeled service note.

Thus, the vectors and labels corresponding to the labeled service notes may comprise a relationship there between that may enable labeling of unlabeled service notes. In an example, the machine learning device 102 generates a function mapping a relationship between vectors and labels corresponding to the labeled service notes. Based on the relationship, the machine learning device 102 may determine a label for an unlabeled service note. Thus, using a set of service notes that is labeled based on user intervention, automatic labeling of further service notes may be performed. In an example, the service notes labeled by the machine learning device 102, may be used to train a fuser event prediction engine 114 to predict malfunction of fuser units.

In an example, the fuser event prediction engine 114 may be a device implemented to predict an error event for a fuser, based on service notes associated with past error events relating to the fuser. In an example, the fuser event prediction engine 114 may be, a server. Further, in an example the server may be a computing device, such as a workstation, a mainframe computer, a desktop, a personal computer, a notebook, a laptop or a portable computer. Further, in one example, the fuser event prediction engine 114 may be a distributed or centralized network system in which different computing devices may host one or more of the hardware or software components of the fuser event prediction engine 114.

Figure 2:
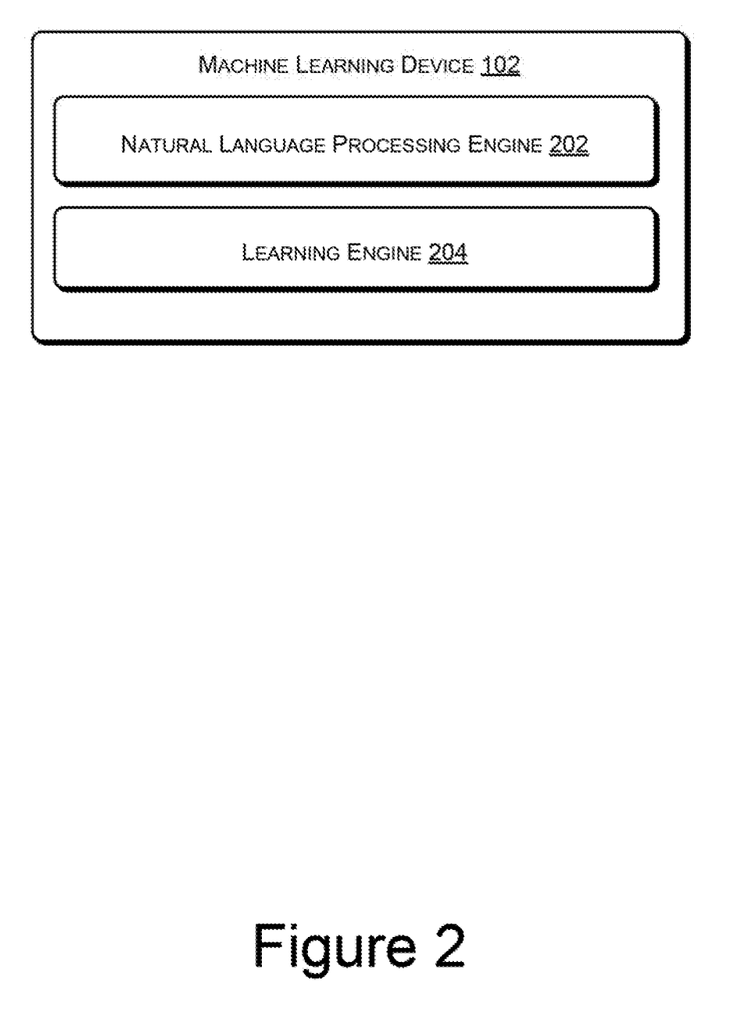
FIG. 2 illustrates a machine learning device for processing service notes associated with fuser units of image rendering devices, in accordance with an example of the present subject matter.

FIG. 2 shows the machine learning device 102, according to an example of the present subject matter.

According to an implementation of the present subject matter, the machine learning device 102 comprises a natural language processing engine 202 and a learning engine 204. In an example, the natural language processing engine 202 processes labeled service notes associated with fuser units of a plurality of image rendering devices 104-1, 104-2, . . . , 104-n to generate a vector corresponding to each of the labeled service notes. As explained in the foregoing description, a labeled service note comprising natural language text describing an error event and a corresponding service activity associated with a fuser unit and the label assigned to the labeled service note is based on a category of failure of the fuser unit. The learning engine 204 learns a relationship between the vectors and the labels corresponding to the labeled service notes. Unlabeled service notes may then be labeled based on the relationship between the vectors and the labels.

Figure 3:
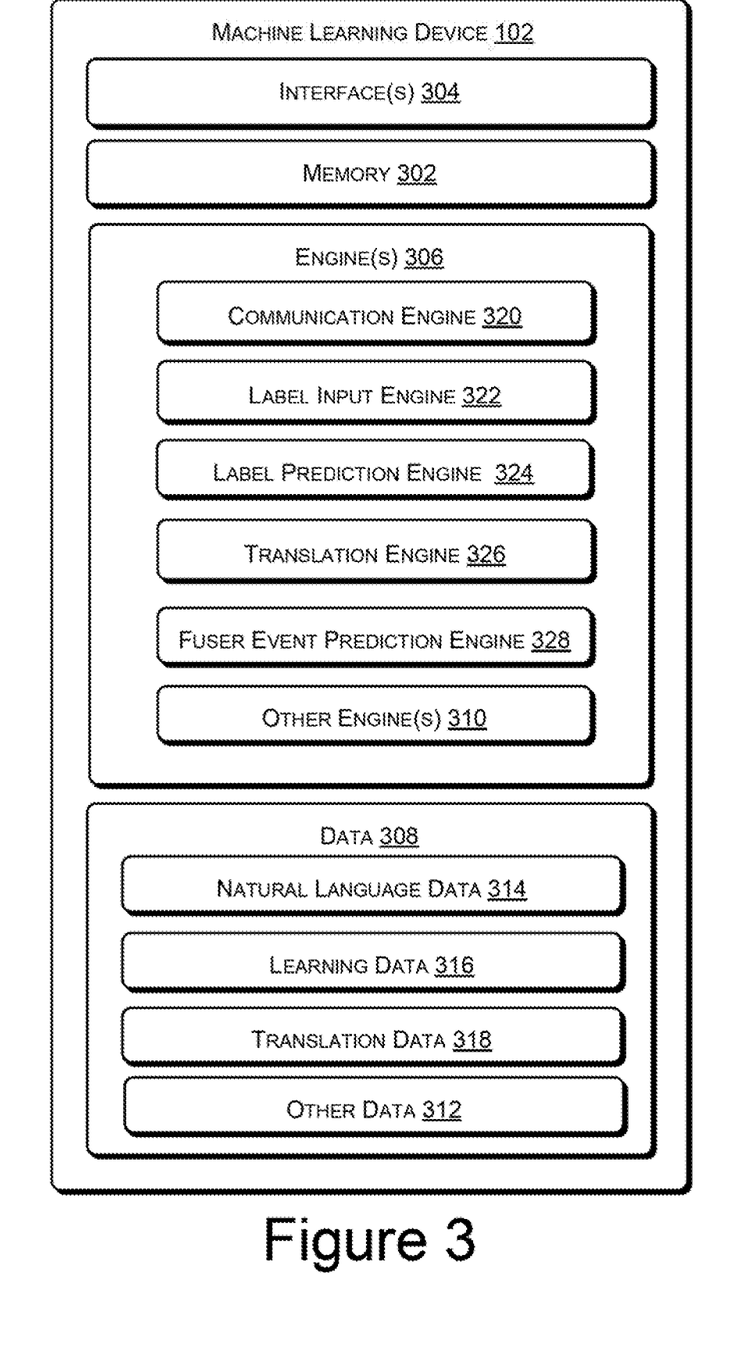
FIG. 3 illustrates a machine learning device for processing service notes associated with fuser units of image rendering devices, in accordance with another example of the present subject matter.

FIG. 3 illustrates the machine learning device 102, according to another example of the present subject matter.

The machine learning device 102, among other things, includes and a memory 302, interface(s) 304, and engine(s) 306. The memory 302 may include any computer-readable medium including, for example, volatile memory (e.g., RAM), and/or non-volatile memory (e.g., EPROM, flash memory, etc.). The interface 304 may include a variety of software and hardware interfaces that allow the machine learning device 102 to interact with other devices, such as the user devices 106-1, 106-2, . . . , 106-n or other input/output (I/O) devices that may be used to provide inputs, such as user inputs and technician remarks to the machine learning device 102.

The engine(s) 306 may be implemented as a combination of hardware and programming (for example, programmable instructions) to implement certain functionalities of the engine(s) 306, such as processing the service notes. In examples described herein, such combinations of hardware and programming may be implemented in several different ways. For example, the programming for the engine(s) 306 may be processor executable instructions stored on a non-transitory machine-readable storage medium and the hardware for the engine(s) 306 may include a processing resource (for example, implemented as either a single processor or a combination of multiple processors), to execute such instructions. In the present examples, the machine-readable storage medium may store instructions that, when executed by the processing resource, implement engine(s) 306. In such examples, the machine learning device 102 may include the machine-readable storage medium storing the instructions and the processing resource to execute the instructions, or the machine-readable storage medium may be separate but accessible to machine learning device 102 and the processing resource. In other examples, engine(s) 306 may be implemented by electronic circuitry. In an example, in addition to the above-mentioned natural language processing engine 202 and the learning engine 204, the engine(s) 306 may also comprise other engine(s) 310 that supplement functions of the machine learning device 102.

The data 308 serves, amongst other things, as a repository for storing data that may be fetched, processed, received, or generated by the engine(s) 306. The data 308 comprises other data 312 corresponding to the other engine(s) 310. In the illustrated example, the data 308 of the machine learning device 102 also comprises natural language data 314, learning data 316 and translation data 318. The other data 312 may store the data pertaining to the other engine(s) 310.

In an implementation, the machine learning device 102 may include a communication engine 320. In operation, the communication engine 320 retrieves inputs of users pertaining to the error events associated with the image rendering devices 104-1, 104-2, . . . , 104-n and remarks of technicians servicing the image rendering devices 104-1, 104-2, . . . , 104-n upon occurrence of the error events. For the purpose, the communication engine 320 may communicate with a database, such as the above-described database 112 that stores details of error events and service activities relating to the plurality of image rendering devices.

In an example, the database 112 may store the user inputs pertaining to the error events in a first column the database 112. In an example, the user input may also include error codes relating to the error events. The database 112 may also store the corresponding remarks of technicians addressing the error events in a second column the database 112. The remarks of technicians may also include the error codes. For example, the database may have numerous rows each comprising a user input and corresponding remarks of a technician in two different columns. The communication engine 320 may retrieve the first column and the second column from the database 112 and may combine the inputs of users pertaining to the error events with corresponding remarks of technicians, for example, by concatenating the text retrieved from two columns, to obtain the service notes. The service notes that the communication engine 320 thus obtains from the database 112 may be stored as in natural language data 314 in data 308 of the machine learning device 102.

The database 112 may store information regarding the error events and service activities relating to the various parts or components of the image rendering devices 104-1, 104-2, . . . , 104-n. Thus, in an example, entries in the numerous rows in the database 112 may relate to the various parts or components. The database 112 may include a third column to record an identifier, such as a part number to identify a component of the image rendering device to which a row pertains. In an example, the part number may be recorded in the database 112 by a technician or user.

In an example, the communication engine 320 filters the service notes associated with the fuser units of the image rendering devices 104-1, 104-2, . . . , 104-n from amongst the various service notes stored in the database 112. The filtering may be based on the part number available in the database 112. Various other filtering techniques, such as a filtering by a user or filtering based on error codes, may also be employed. The filtered service notes may be stored as natural language data 314 in data 308 of the machine learning device 102.

The filtered service notes may be labeled as explained above. A label input engine 322 of the machine learning device 102 may be implemented to assign labels to the service notes associated with the fuser units to obtain the labeled service notes. The labeling of a service note may be performed by a user who may determine a cause of failure of a corresponding fuser unit by analyzing the natural text description included in the service note. For example, to label a service note, a user may use a user device, such as user device 106-1 to access the filtered service notes stored in natural language data 314 via interface(s) 304. The user may analyze a filtered service notes and indicate a label which the label input engine 322 then assigns to the service note.

It will be appreciated that initial labeling of few of the filtered service notes may generate a finite number of labels that may then be assigned to further filtered service notes. In some example implementations, the labeling of a service note may be performed by the machine learning device 102 based on predefined rules defined by users. In an example, the labeled service notes may be stored as the learning data 316 in data 308 of the machine learning device 102.

The labeled service notes are processed by the natural language processing engine 202. In an example, the labeled service notes are cleaned to remove the letters, symbols, syntaxes etc. For example, symbols, such as '[, ˆ, >, *, /' are removed from the labelled service notes. In another example, standalone numbers not occurring with any word, standalone character that appears alone are also removed while cleaning. In an example, after cleaning the data, the natural language processing engine 202 tokenizes the data such that the data is represented as strings. Consider an example of "printer hardware branch scanning problem troubleshoot etb and fuser Bx.xx.01" as a service note obtained from combining a user input "printer hardware branch scanning problem" and a technician remark "troubleshoot etb and fuser Bx.xx.01". The tokenized string may be 'printer', 'hardware', 'branch', 'scanning', 'problem', 'troubleshoot', 'fuser', 'Bx.xx.01'. In an example, error codes are extracted from the cleaned labeled service notes. For extracting error codes from each of the cleaned labeled service notes, the cleaned service notes are filtered based on a predetermined length and format of the error codes. For example, if the predetermined length and format of error codes comprises six characters, in the format XX.XX.XX, the labeled service notes having six characters appearing in three consecutive groups of two characters each are filtered and error codes are extracted from them. In an example, the error code or a part thereof, such as first two characters of the error codes are combined with the respective cleaned labeled service notes to obtain combined labeled service notes. For the purpose, the error code may be concatenated with the tokenized string obtained from the respective cleaned labeled service notes. In an example, if there are no error codes in a labeled service note, the service note may be marked with a token to indicate the same. For example, the labeled service note without the error code may be marked as 'no_error_code'.

After the combined service notes are generated, features are created for the labeled service notes. In an example, techniques, such as term frequency and inverse document frequency may be used to create features. The features are thereafter converted into vectors. As the vectors are generated from the labeled service notes, the vectors also have their corresponding labels. The vectors along with their corresponding labels may be stored in the learning data 316.

The learning engine 204 learns a relationship between the vectors and labels corresponding to the labeled service notes. For instance, occurrence of a given set of words, such as 'high temperature', 'hot', 'heat', in a service note may indicate that the service note is related to a label indicative of a cause of failure to be 'over-heating'. Similarly, a vector corresponding to a service note that contains terms, such as 'noise', 'sound', 'loud' may be related to a label named 'roller issues' indicative of a cause of failure to be related to malfunctioning of rollers or the fuser unit. In an example, the learning engine 204 generates a function indicative of the relationship between the vectors and labels. The function may also be stored in the learning data 316.

In an example, the learning engine 204 may use an algorithm, such as gradient boosting, random forest, deep learning to generate the function indicative of the relationship between the vectors and labels corresponding to the labeled service notes. In several examples, it is also feasible for the learning engine 204 to generate more than one functions, wherein in each function is generated based on a different algorithm or a different combination of algorithms. As will be understood, implementations where the machine learning device 102 incorporates multiple learning engines each operating based on a different algorithm or a different combination of algorithms are also possible.

The machine learning device 102, in an implementation, includes a label prediction engine 324 is to determine a label for an unlabeled service note based on at least one of the relationships learnt by the learning engine 322. Since the relationship learnt by the learning engine 322 maps vectors to their corresponding labels, to label the unlabeled service note, a vector corresponding to the unlabeled service note is generated by the label prediction engine 324. The unlabeled service note is converted into a vector in accordance with the techniques described in the foregoing description. In an example, the label prediction engine 324 may obtain the vector of the unlabeled service note in coordination with the natural language processing engine 202. Thereupon, the label prediction engine 324 uses the vector of the unlabeled service note and at least one of the functions generated by the learning engine 322 to assign the label.

In examples where the learning engine 204 may generate more than one functions, the label prediction engine 324 may determine a label using each of the functions. To determine the label that may be finally assigned to the unlabeled service note, a vote of the more than one functions may be considered. For instance, if the learning engine 204 uses three different algorithms to generate three different functions, the label determined by majority of the three functions may be considered.

In an example, if the unlabeled service note is not in English language, the same may be translated into English prior to converting the unlabeled service note into its corresponding vector. For the purpose, the machine learning device 102 may include a translation engine 326 that may determine the unlabeled service note to be in a language other than English, it identifies the non-English language of the unlabeled service note and accordingly provides for the translation. For example, in case the translation engine 326 identifies the non-English language to be French, the translation engine 326 use French to English translation engine, to translate the unlabeled service note into English. Thus, the translation engine may identify the non-English language in which the service note is written and invoke a corresponding translation engine. In an example, the translated unlabeled service note may be stored as the translation data 318 in data 308 of the machine learning device 102. Once translated, the vector of the unlabeled service note is generated and assigned a label as explained above.

In an example, the machine learning device 102 may also incorporate a fuser event prediction engine 328. The labeled service notes may serve as a training data for the fuser event prediction engine 328 such that the fuser event prediction engine 328 is enabled to predict an error event for a fuser, based on service notes associated with past error events relating to the fuser. As evident, the fuser event prediction engine 328 may also reside external to the machine learning device 102, similar to the above described fuser event prediction engine 114.

Figure 4:
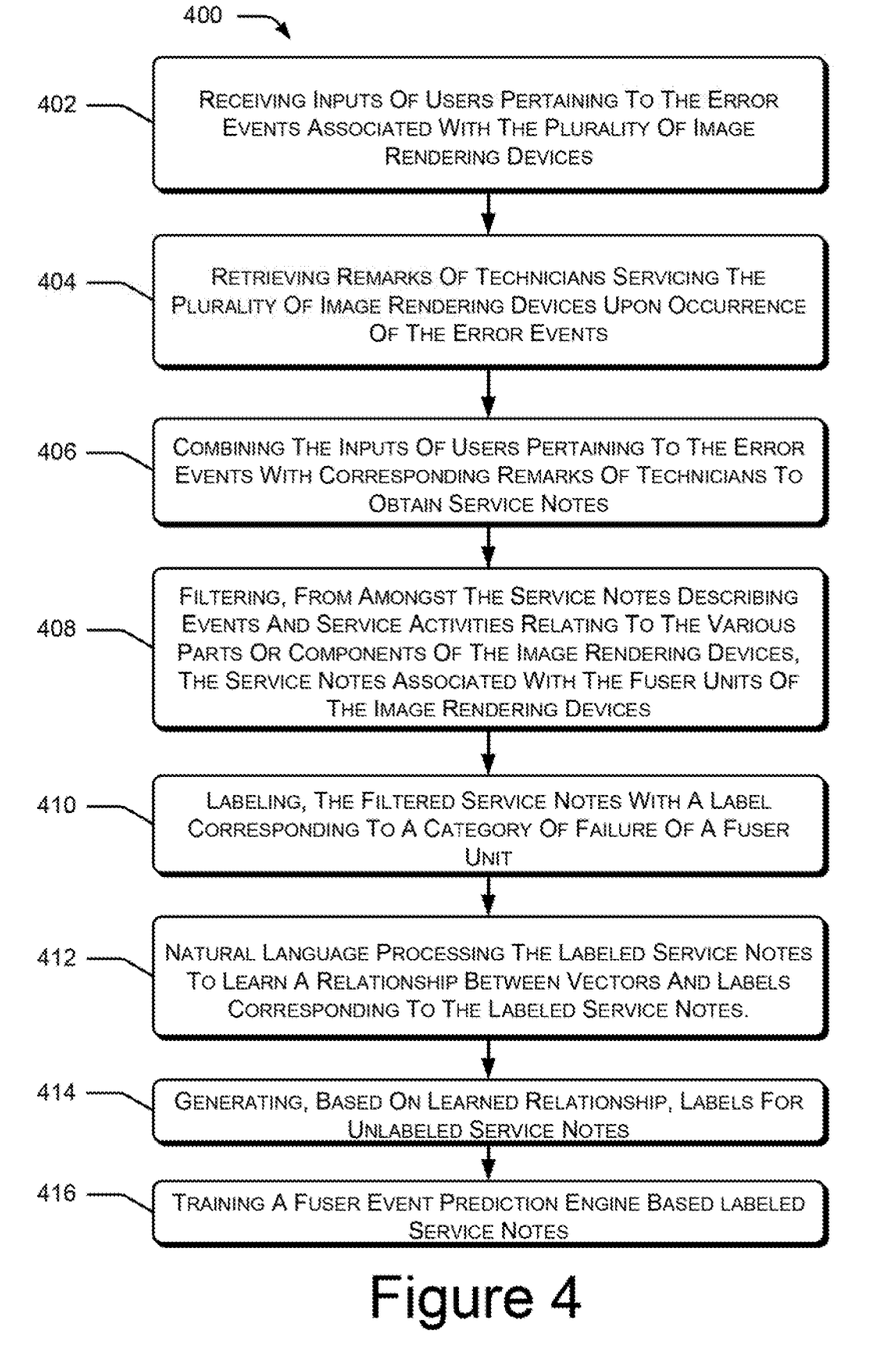
FIG. 4 illustrates a method of processing service notes, in accordance with an example of the present subject matter.

FIG. 4 illustrates a method 400 for processing service notes, according to an example of the present subject matter. Although the method 400 may be implemented in a variety of devices, for the ease of explanation, the present description of the example method 400 to process the service notes is provided in reference to the above-described machine learning device 102 implemented in the print environment 100.

The order in which the method 400 is described is not intended to be construed as a limitation, and any number of the described method blocks may be combined in any order to implement the method 400, or an alternative method.

It may be understood that blocks of the method 400 may be performed by the machine learning device 102. The blocks of the method 400 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 4, at block 402, inputs of users pertaining to the error events associated with the plurality of image rendering devices is retrieved. Similarly, at block 404, remarks of technicians servicing the plurality of image rendering devices upon occurrence of the error events is also retrieved. The inputs of users and remarks of technicians may be retrieved from a database, such as database 112 that stores details of error events and service activities relating to the image rendering devices. In an example, the communication engine 320 of the machine learning device 102 may obtain the inputs of users and remarks of technicians from the database 112.

At block 406, the inputs of users pertaining to the error events may be combined with corresponding remarks of technicians to obtain service notes. Combining the inputs of users and remarks of technicians to obtain the service notes may be performed by the communication engine 320 in an example.

From amongst the service notes describing events and service activities relating to the various parts or components of the image rendering devices, the service notes associated with the fuser units of the image rendering devices are filtered at block 408. For example, the service notes retrieved from the database 112 may be filtered based on part numbers as explained before.

The block 410, the filtered service notes are labeled with a label corresponding to a category of failure of a fuser unit. The labeling of the filtered service notes, in an example, involves manual processing of the filtered service notes by users to categorize the service notes into various categories of failures of fuser units. In an example, the labeling may be performed by the machine learning device 102 based on predefined rules inbuilt in the machine learning device 102.

The block 412, the labeled service notes are natural language processed to learn a relationship between vectors and labels corresponding to the labeled service notes. Based on the relationship determined at block 412, at block 414, labels are generated for unlabeled service notes. The unlabeled service notes thus labeled at block 414 are used to train a fuser event prediction engine, at block 416.

Figure 5:
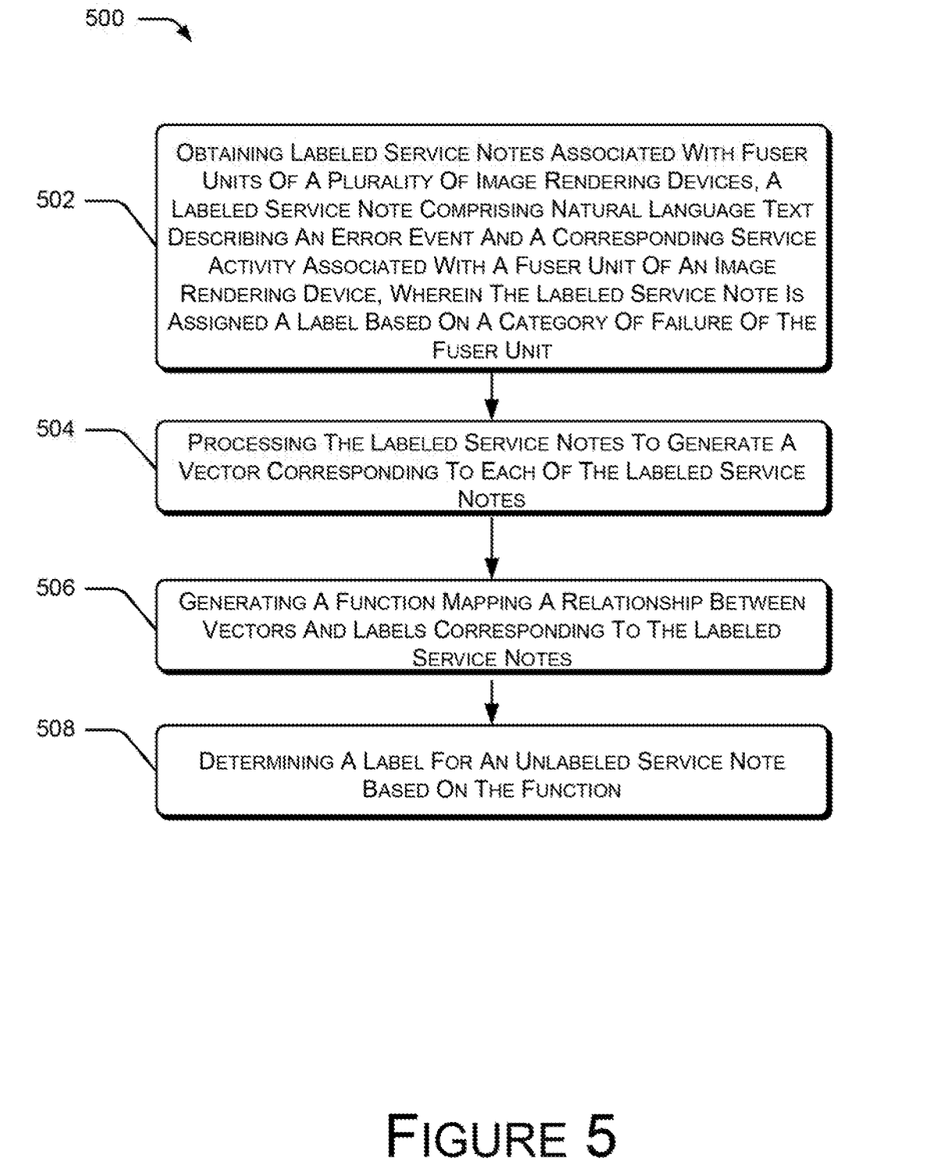
FIG. 5 illustrates a method of processing service notes associated with fuser units of image rendering devices, in accordance with another example of the present subject matter.

Reference is now made to FIG. 5 that illustrates a method of processing service notes associated with fuser units of image rendering devices, in accordance with another example of the present subject matter. Although the method 500 may be implemented in a variety of devices, for the ease of explanation, the present description of the example method 500 to process the service notes is provided in reference to the above-described machine learning device 102 implemented in the print environment 100.

The order in which the method 500 is described is not intended to be construed as a limitation, and any number of the described method blocks may be combined in any order to implement the method 500, or an alternative method.

It may be understood that blocks of the method 500 may be performed by the machine learning device 102. The blocks of the method 500 may be executed based on instructions stored in a non-transitory computer-readable medium, as will be readily understood. The non-transitory computer-readable medium may include, for example, digital memories, magnetic storage media, such as magnetic disks and magnetic tapes, hard drives, or optically readable digital data storage media.

Referring to FIG. 5, at block 502, labeled service notes associated with fuser units of a plurality of image rendering devices are obtained. In an example, the communication engine 320 of the machine learning device 102 may obtain the labeled service notes from a database, such as the above described database 112 that stores details of error events and service activities relating to a plurality of image rendering devices.

At block 504, the labeled service notes are processed. The labeled service notes are processed to convert the labeled service notes into their corresponding vectors. In an example, the natural language processing engine 202 of the machine learning device 102 may be generate the vectors. Since examples of techniques of converting a labeled service notes into its corresponding vector is previously explained, the same is not elaborated here for sake of brevity of the present description.

Once the vectors and labels corresponding to the labeled service notes are obtained, at block 506, the vectors and labels are analyzed to generate a function mapping, a relationship between vectors and labels. In an example, the learning engine 204 may determine the function. Based on the function, at block 508, a label for an unlabeled service note is determined. For instance, the label prediction engine 324 of the machine learning device 102 may determine a label for the unlabeled service note based on the function determined by the learning engine 204.

Figure 6:
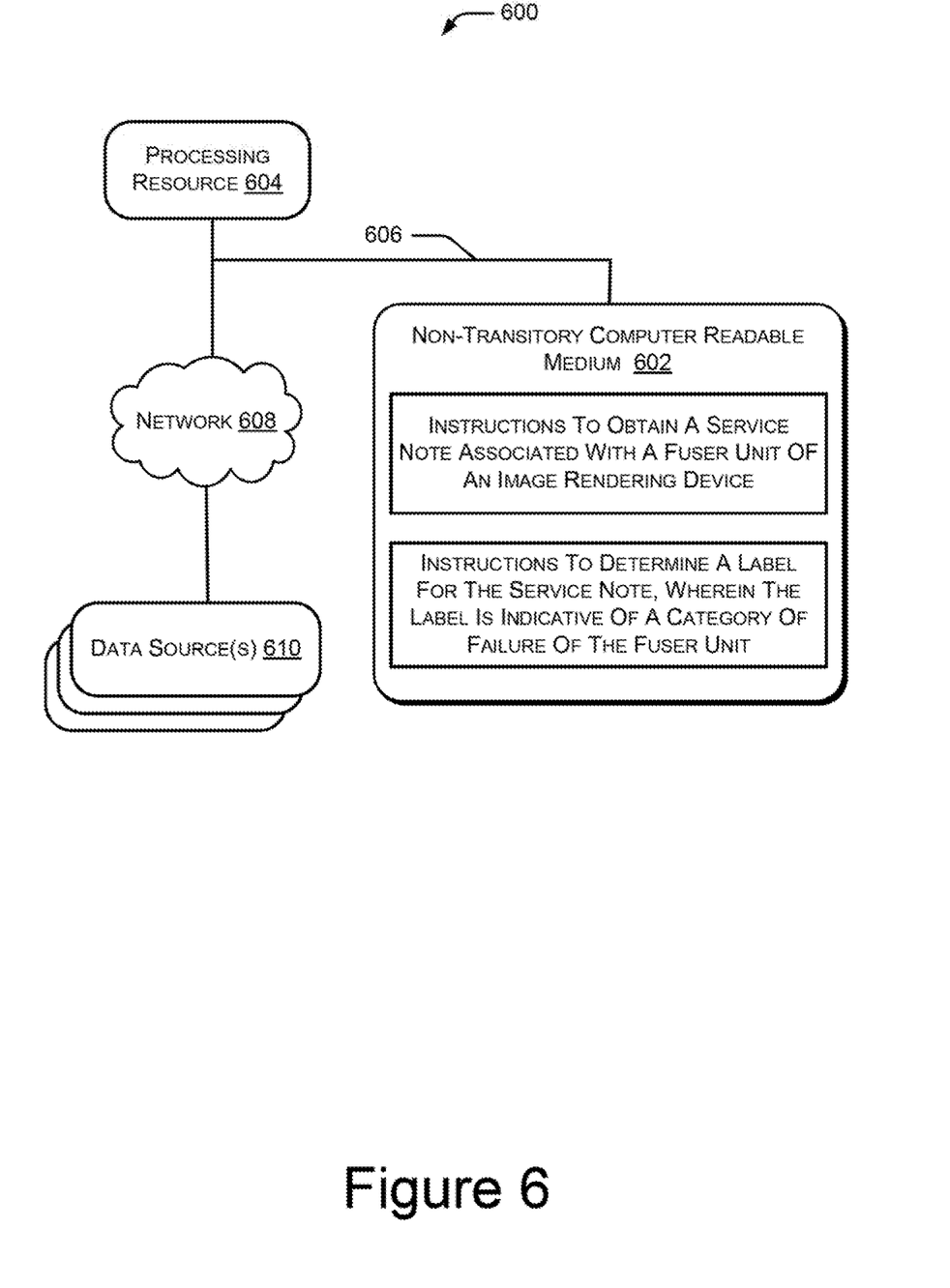
FIG. 6 illustrates a computing environment implementing a non-transitory computer-readable medium for processing service notes associated with fuser units of image rendering devices, according to an example of the present subject matter.

FIG. 6 illustrates a computing environment 600 implementing a non-transitory computer-readable medium 602 for processing service notes associated with the fuser units of image rendering devices, according to an example of the present subject matter. In an example implementation, the computing environment 600 may comprise a computing device, such as the machine learning device 102. The computing environment 600 includes a processing resource 604 communicatively coupled to the non-transitory computer-readable medium 602 through a communication link 606. In an example, the processor resource 604 may be a processor of the computing device, that fetches and executes computer-readable instructions from the non-transitory computer-readable medium 602.

The non-transitory computer-readable medium 602 can be, for example, an internal memory device or an external memory device. In an example implementation, the communication link 606 may be a direct communication link, such as any memory read/write interface. In another example implementation, the communication link 606 may be an indirect communication link, such as a network interface. In such a case, the processing resource 604 can access the non-transitory computer-readable medium 602 through a network 608. The network 608 may be a single network or a combination of multiple networks and may use a variety of different communication protocols.

The processing resource 604 and the non-transitory computer-readable medium 602 may also be communicatively coupled to data sources 610. The data source(s) 610 may be used to store the learning data, translation data, natural language data in an example. In an example implementation, the non-transitory computer-readable medium 602 comprises executable instructions for processing service notes associated with the fuser units of image rendering devices. For example, the non-transitory computer-readable medium 602 may comprise instructions executable to implement the previously described engines, such as communication engine, label input engine, label prediction engine, translation engine etc.

In an example, the instructions cause the processing resource 604 to obtain a service note associated with a fuser unit of an image rendering device. As explained earlier, the service note comprises natural language text describing an error event and a corresponding service activity relating to the fuser unit. The instruction may further determine if the service note is in English language and in case the service note is not in English language, the instructions 612 may cause the service notes to be translated into English.

Thereafter, the instructions cause the processing resource 604 to determine a label for the service note, wherein the label is indicative of a category of the failure of the fuser unit. In an example, the category may be 'print quality related issue', 'paper jam issue', 'noise related issue', 'heating relating issue'. The label is generated based on a function mapping a relationship between labels and corresponding labeled service notes associated with fuser units of a plurality of image rendering devices. In an example, the mapping relationship may be stored in the learning data, such as the learning data 316 of the machine learning device 102 as explained above. The instructions cause the processing resource 604 to access the learning data and thereafter determine a label for the service note based on the mapping relationship. The mapping relationship may be generated by natural language processing of the service notes as explained above.

Thus, the methods and systems of the present subject matter provide techniques for processing service notes associated with fuser units of image rendering devices. Although implementations of processing the service notes have been described in a language specific to structural features and/or methods, it is to be understood that the appended claims are not necessarily limited to the specific features or methods described. Rather, the specific features and methods are disclosed as example implementations for processing the service notes.

The invention claimed is:

1. A method comprising:
obtaining labeled service notes associated with fuser units of a plurality of image rendering devices, each labeled service note comprising natural language text describing an error event and a corresponding service activity associated with a fuser unit of an image rendering device, wherein each labeled service note is assigned a label based on a category of failure of the fuser unit;
processing the labeled service notes to generate vectors respectively corresponding to the labeled service notes;
generating a function mapping a relationship between the vectors and the labels of the labeled service notes; and
determining a label for an unlabeled service note based on the function.

2. The method as claimed in claim 1, wherein processing the labeled service notes comprises, for each labeled service note:
analyzing the labeled service note to determine if an error code relating to the error event described in the labeled service note is included in the labeled service note; and
extracting the error code based on the analyzing to generate the vector corresponding to the labeled service note.

3. The method as claimed in claim 1 further comprising:
retrieving service notes associated with the plurality of image rendering devices, from a database, wherein the database stores details of error events and service activities relating to the plurality of image rendering devices; and
filtering the service notes associated with the fuser units of the plurality of image rendering devices.

4. The method as claimed in claim 3 further comprising:
capturing, in the database, the error events based on user inputs pertaining to the error events; and
capturing, in the database, the service activities based on remarks of technicians servicing the plurality of image rendering devices further to the error events.

5. The method as claimed in claim 3, further comprising labeling, based on predefined rules, the filtered service notes associated with the fuser units to obtain the labeled service notes.

6. The method as claimed in claim 1, further comprising translating the unlabeled service note into English language if the unlabeled service note is in a language other than English.

7. A machine learning device comprising:
a natural language processing engine to:
process labeled service notes associated with fuser units of a plurality of image rendering devices to generate vectors respectively corresponding to the labeled service notes, each labeled service note comprising natural language text describing an error event and a corresponding service activity associated with a fuser unit, wherein each labeled service note is assigned a label based on a category of failure of the fuser unit; and
a learning engine to:
learn a relationship between the vectors and the labels of the labeled service notes.

8. The machine learning device as claimed in claim 7, further comprising a label prediction engine to determine a label for an unlabeled service note based on the relationship learned by the learning engine.

9. The machine learning device as claimed in claim 7, further comprising, a fuser event prediction engine trained using service notes labeled based on the relationship between the vectors and the labels, to predict malfunctioning event for a given fuser unit.

10. The machine learning device as claimed in claim 7, further comprising a communication engine to:
retrieve, from a database storing details of error events and service activities related to the plurality of image rendering devices,
inputs of users pertaining to the error events; and
remarks of technicians servicing the plurality of image rendering devices upon occurrence of the error events; and
combine the inputs of users pertaining to the error events with the remarks of technicians to obtain service notes.

11. The machine learning device as claimed in claim 10, wherein the communication engine is to filter the service notes associated with the fuser units of the plurality of image rendering devices.

12. The machine learning device as claimed in claim 10, further comprising a label input engine to assign labels to the service notes associated with the fuser units to obtain the labeled service notes based on user inputs.

13. The machine learning device as claimed in claim 8, further comprising a translation engine to:
determine the unlabeled service note to be in a language other than English; and
translate the unlabeled service note into English.

14. A non-transitory computer-readable medium comprising instructions executable by a processing resource to:
obtain a service note associated with a fuser unit of an image rendering device, the service note comprising natural language text describing an error event and a corresponding service activity relating to the fuser unit; and
determine a label for the service note, wherein the label is indicative of a category of failure of the fuser unit, wherein
the label is generated based on a function mapping a relationship between labels and corresponding labeled service notes associated with fuser units of a plurality of image rendering devices.

15. The non-transitory computer-readable medium as claimed in claim 14, further comprising instructions executable by the processing resource to translate the obtained service note into English.

* * * * *